Dec. 27, 1966    D. HARTLEY ETAL    3,294,449
APPARATUS FOR AUTOMATICALLY CONTROLLING THE STEERING
OF A MINERAL MINING MACHINE
Filed Aug. 6, 1962    3 Sheets-Sheet 1

Inventors
Dennis Hartley
Laurence Reade Cooper
By Stevens, Davis, Miller & Mosher
Attorneys Dec. 27, 1966   D. HARTLEY ETAL   3,294,449
APPARATUS FOR AUTOMATICALLY CONTROLLING THE STEERING
OF A MINERAL MINING MACHINE
Filed Aug. 6, 1962   3 Sheets-Sheet 2
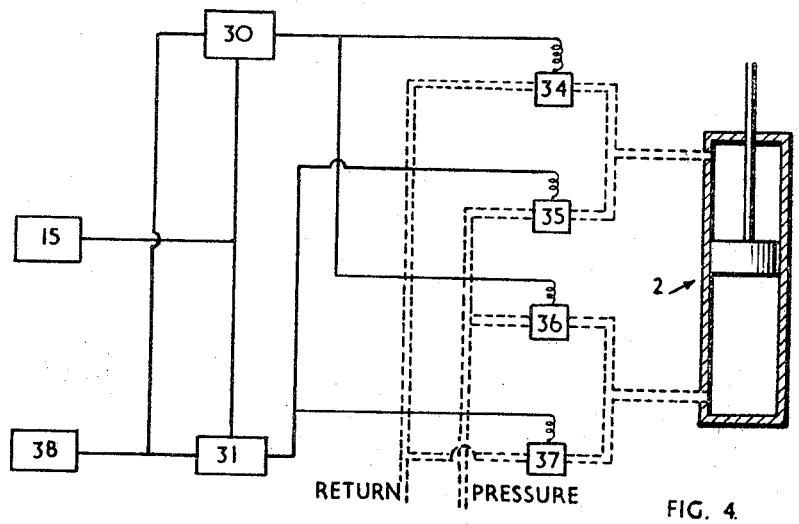
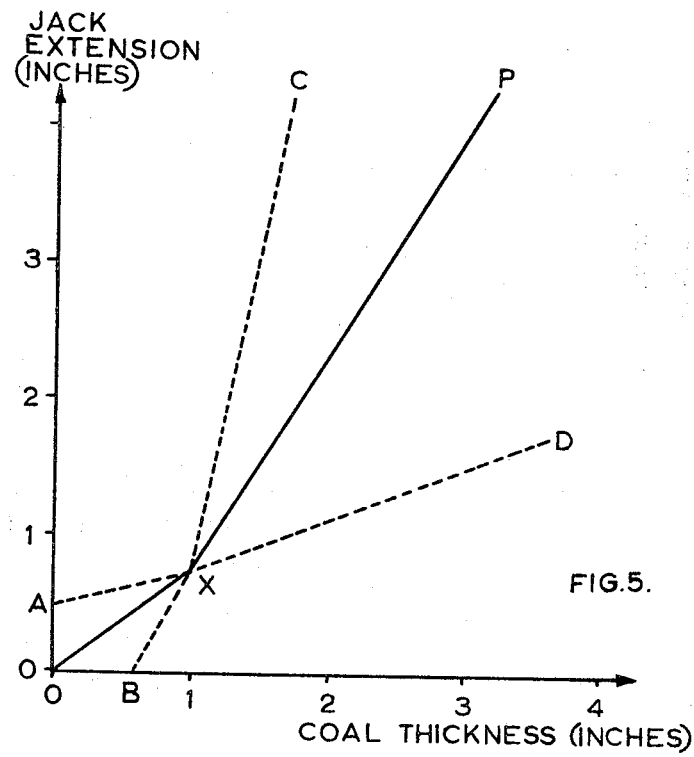
Inventors
Dennis Hartley
Laurence Reade Cooper
By Stevens, Davis, Miller & Mosher
Attorneys

United States Patent Office 3,294,449
Patented Dec. 27, 1966

3,294,449
APPARATUS FOR AUTOMATICALLY CONTROLLING THE STEERING OF A MINERAL MINING MACHINE
Dennis Hartley, Stanwell, Middlesex, and Laurence Reade Cooper, Datchet, England, assignors to Coal Industry (Patents) Limited, London, England
Filed Aug. 6, 1962, Ser. No. 215,099
Claims priority, application Great Britain, Aug. 14, 1961, 29,242/61
5 Claims. (Cl. 299—1)

This invention relates to apparatus for automatically controlling the steering of a mineral mining machine during operation of the machine in a mineral seam so that the machine follows a given direction of travel with respect to the boundary of the seam of mineral and remains within the seam.

According to the invention, such apparatus comprises an extensible hydraulic jack for controlling the direction of travel of the machine in the mineral seam, means for producing a first electrical signal having a characteristic dependent on the extension of the jack, a source of electromagnetic radiation mounted on the machine, a device responsive to the amount of radiation back-scattered by material adjacent the machine and adapted to produce a second electrical signal having a characteristic dependent on the amount of back-scattered radiation received by the device, discriminating means fed with both said signals and adapted to produce from them an output signal having a characteristic indicative of the steering connection required to restore the machine to a desired direction of travel in the mineral, and electro-hydraulic valve response to the output signal and arranged to control the supply or exhaust of hydraulic fluid to or from the jack to effect steering of the machine.

The signals are preferably unidirectional voltages. The discriminating means may comprise a section in which the signal dependent on the amount of back-scattered radiation is algebraically added to a reference signal having a magnitude chosen to correspond to the back-scattering received at a given desired position of the machine in the mineral and a second section in which the algebraic sum forming the output from the first section is compared with the signal whose magnitude is dependent on the extension of the jack to produce an output signal having a characteristic indicative of the steering connection required to restore the machine to the desired direction of travel in the mineral.

More than one hydraulic jack may be provided on the machine if desired.

Preferably, the hydraulic jack is arranged to alter the direction of travel of the machine in a vertical plane. In the case where the mineral being mined is coal, the jack or jacks are arranged to steer the machine in a vertical plane and the jacks are controlled so that the machine remains in the seam and leaves, for example, one inch of floor coal.

In an advantageous form of the invention, the means for producing an electrical signal (in this case a voltage) whose magnitude is dependent on the extension of the jack comprises a potentiometer attached to the jack and arranged so that movement of the jack piston within the jack cylinder causes a corresponding displacement of the variable tapping of the potentiometer. On some types of mineral cutting machines it has been found preferable to use a potentiometer of the non-linear type, since it has been found that such types of machine require less change in jack position to cause the machine to cut upwardly at a given angle to its previous direction of travel than downwardly at the same angle. Alternatively, two separate potentiometers may be provided on the jack, one being used when the jack is extended and the other being used when the jack is contracted. This latter arrangement has the advantage of allowing independent variation of the ratio of jack movement per unit output signal from the discriminating means between upward and downward movements. One example of such an arrangement has two potentiometers both of whose variable tappings are mechanically connected to the jack piston, and an electronic switch responsive to the voltage which defines level cutting operates to disconnect one or other of the potentiometers from the discriminating means according to whether the voltage output from the potentiometers is greater or less than the voltage defining level cutting.

A specific embodiment of the invention as applied to a coal mining machine will now be described with reference to the accompanying drawings in which.

Figure 2:
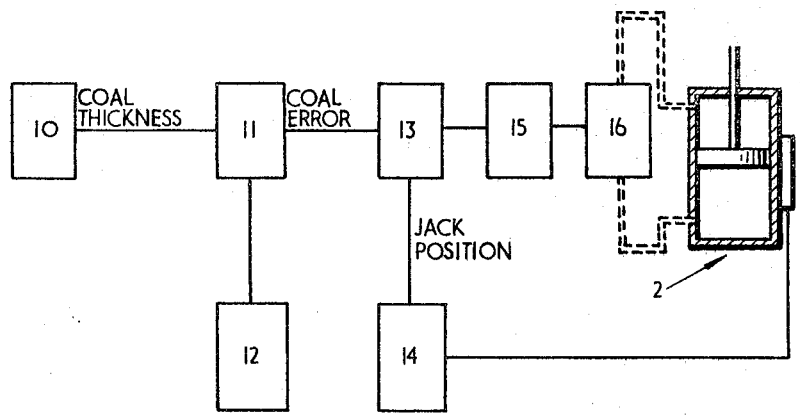
FIGURE 2 is a block diagram of electrical and hydraulic control circuits.
Figure 3:
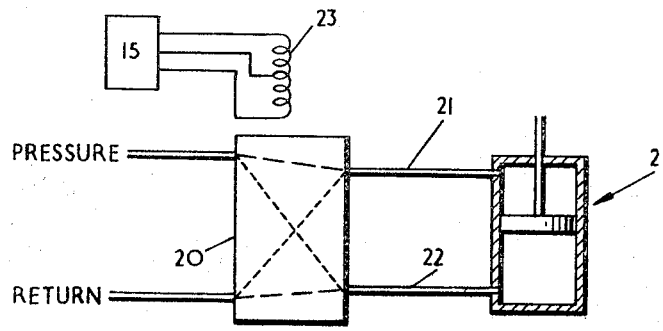
Figure 6:
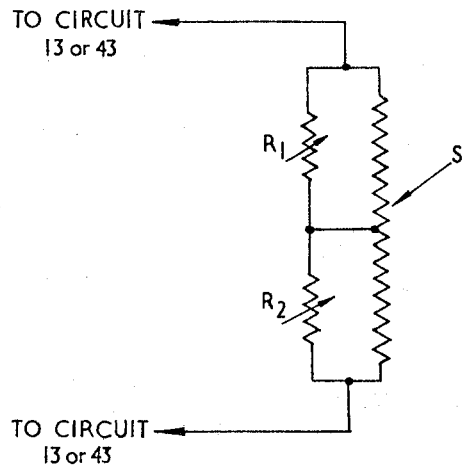
Figure 7:
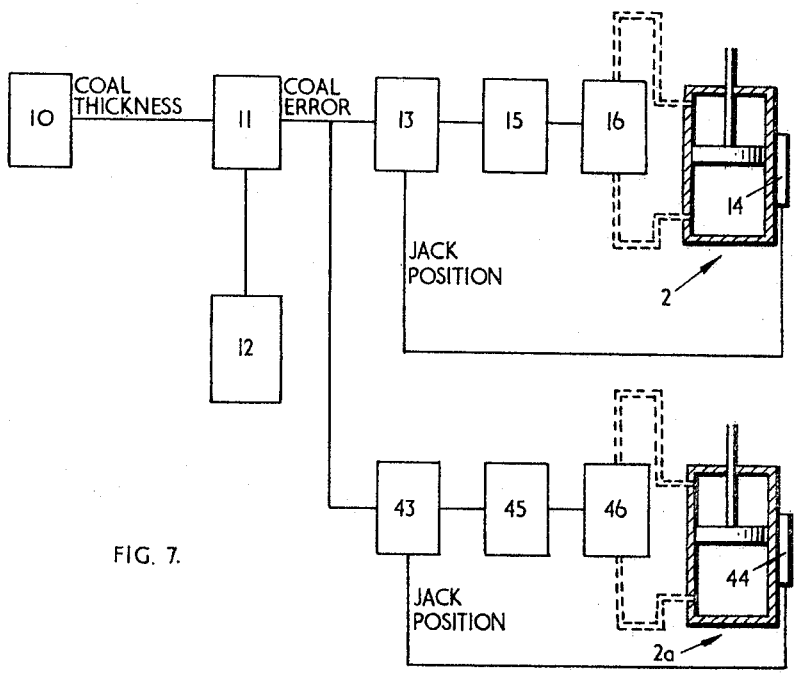

FIGURES 3 and 4 are diagrammatic illustrations of alternative forms of hydraulic fluid circuits which may be used in the apparatus according to the invention, FIGURE 5 is a graph showing the relationship between coal thickness and jack position, FIGURE 6 is a diagram of a non-linear potentiometer which may be used to achieve a relationship of the type shown in FIGURE 5, FIGURE 7 is a block diagram of an electrical and hydraulic control circuit alternative to that shown in FIGURE 2.

Figure 1:
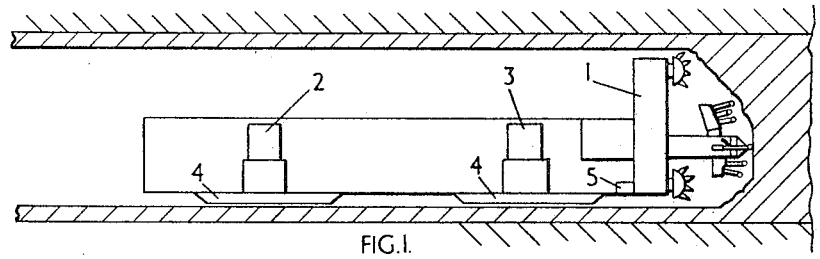
FIGURE 1 is a diagrammatic side elevation of a mining machine.

Referring to FIGURE 1, the mining machine, which is of known design, has a cutting head 1 mounted on a body which is supported on skids 4 by means of two pairs of hydraulic jacks, only one of each pair, 2 and 3, being shown in the drawings. A compartment 5 is located just to the rear of the cutting head and contains a source of electromagnetic radiation (e.g. gamma rays, X-rays or bremsstrahlung) and a device responsive to radiation back-scattered by the adjacent material (e.g. a Geiger counter). A suitable radioactive source is Thulium 170. This device (10 in FIGURE 2) produces a signal which is proportional to the thickness of coal beneath the skids. Referring now to FIGURE 2, which shows the simplest system in which only one hydraulic jack is used to effect vertical steering, this signal is compared with a reference voltage signal by applying it to a potentiometer device 11. The difference, which may be either positive or negative, is applied to a discrimination circuit 13 in the form of a differential amplifier having two inputs and a single output and which is preferably of the well known type including a fully-balanced pair of transistors connected in common-emitter configuration. The reference voltage signal is generated by any convenient source 12 such as a potentiometer the signal magnitude and sense is chosen to correspond in value to a certain desired thickness of coal to be left on the floor. For example, if it were intended that the machine should be steered so as to leave one inch of floor coal then the reference signal would be equal in magnitude to the output of the Geiger counter when receiving the quantity of back-scattered rays arising from one-inch-thick coal and surrounding material.

The output from device 11, which can be regarded as a "coal error" signal, is supplied to the base of one of the pair of transistors in circuit 13 that is to one of the inputs at the circuit. A signal indicative of the position of the vertical steering jacks 2 is applied to the base of the other transistor in circuit 13 that is to the other one of the inputs of the circuit 13. As stated, this latter signal derived from a potentiometer 14 mounted on the jack. The output from circuit 13, resulting from the algebraic combination of the "coal error" signal and the "jack position" signal is then applied to a circuit 15 and is used to operate an electro-hydraulic valve schematically represented at 16. This valve controls by way of the conduits schematically shown in dashed lines, the supply and exhaust of hydraulic fluid to and from the steering jacks 2, more details of this are shown in FIGURES 3 and 4. When the electro-hydraulic valve used is of the type shown in FIGURE 3, the circuit 15 comprises a known form of balanced D.C. amplifier whose output is applied symmetrically to the centre-tapped coil of valve 23. When the system of FIGURE 4 is used, the circuit 15 consists of an electronic switch comprising a bi-stable transistor switching circuit whose switching state is governed by the input voltage.

Two alternative forms of hydraulic fluid control systems may be used; the first, illustrated in FIGURE 3, utilises a known electric-hydraulic valve of the continuously acting 4-port type, in which the flow of fluid through the valve is proportional to the current flowing through the operating coil. With this valve the output of the balanced D.C. amplifier 15 is applied directly to the tapped coil 23 of the valve 20. The jack 2 is connected to the valve 20 by pipes 21, 22, and the other side of the valve is connected to the main pressure and return fluid lines on the mining machine.

The second form of hydraulic control, illustrated in FIGURE 4, employs four on-off switching solenoid valves 34, 35, 36 and 37. With these valves the flow of fluid is either maximum or zero. The signal from the circuit 15 is fed to two electronic by-stable switching circuits 30 and 31, one of which is arranged to respond only to signals above a certain level and the other to respond only to signals below a certain level. If desired, these levels may be slightly separated so that there is a "dead area" in which the difference between "coal error" and "jack position" is small and in which no action is taken to correct the steering of the machine. Signals above a certain level actuate switch 30 and connect an energising voltage 38 to the coils of valves 34 and 36 causing them to open thus permitting exhaust of hydraulic fluid from the upper portion of the jack 2 through valve 34 and supply of fluid through valve 36 to the lower portion. The jack is thus raised steering the machine downwardly. A signal below a certain level acts in a similar way to open valves 35 and 37 and cause the jack to be lowered and the machine to be steered upwardly.

In the two simplest embodiments described with particular reference to FIGURES 2 and 3, and FIGURES 2 and 4, only one jack is used to effect vertical steering. The system applied to steer a mining machine of the type shown in FIGURE 1 involves the use of two hydraulic jacks and the arrangement of such a system is shown in FIGURE 7. The jack 2 arranged at the rear on one side of the machine is controlled by the parts 13, 14, 15 and 16 which correspond to similarly numbered parts in FIGURE 1, and the jack 2a arranged at the rear and on the other side of the machine is controlled by an exactly analagous set of parts 43, 44, 45 and 46 which accept the same "coal error" signal but which utilise a "jack position" signal derived from the jack 2a. That is the two jacks are operated from one device 10.

In the case of a longwall mining machine of the type shown in FIGURE 1 which has one source of electromagnetic radiation and one device responsive to radiation, that is to say one gamma ray source and one Geiger counter, on each side of the machine immediately behind the cutting head, the two jacks 2 and 2a at the rear of the machine may be linked to the coal thickness measuring arrangement, that is to say the part 5 and associated circuitry, in various ways, two of which will now be given by way of example. In the first system, the coal thickness measuring arrangement on the leading left-hand side of the machine is arranged to control the jack 2 on the rear right-hand side of the machine, and the coal thickness measuring arrangement on the leading right-hand side of the machine is arranged to control the jack 2a on the rear left-hand side of the machine. The arrangement of FIGURE 1 is used to operatively link the coal thickness measuring arrangement and the jack in this instance. In the second system, the coal thickness measuring arrangement on the face of the machine is operatively connected to control both the rear jacks 2 and 2a using the system as shown in FIGURE 7. When the machine is turned round to travel in the opposite direction along the face, this coal thickness measuring arrangement is disconnected and that on the other side of the machine is connected to control the two jacks 2 and 2a and thus control the steering of the machine, once again using the system of FIGURE 7 to link the coal thickness measuring arrangement with the jacks. In this way, the machine is controlled by the coal thickness measuring arrangement nearer to the coal face whichever direction along the face the machine is travelling.

As has been stated, on some types of mineral cutting machine it is desirable to use a non-linear potentiometer. FIGURE 5 is a graph showing the possible relationships between coal thickness and jack extension using the non-linear potentiometer shown in FIGURE 6. The variable tapping S of the potentiometer is mechanically linked to the jack piston so that movement of the piston with the jack cylinder causes the tapping or slider S to move along the resistive track. The change of voltage output from the potentiometer per unit distance moved by the slider S can be varied by varying the pre-set resistances R1 and R2. The slope of the line OX can be varied between limits AX and BX by changing R1 from its minimum value to maximum value, and correspondingly, the slope of the line XP can be varied between the limits XD and XC by changing R2 from its minimum to its maximum value. The line OXP represents the preferred characteristic of the control system according to the invention when applied to the mining machine of the type particularly described in FIGURE 1, since with this machine it has been found that the machine has a slower response to upward movement of the jack piston (i.e. to cause the machine to cut downwardly) than it has to downward movement of the jack piston (i.e. to cause the machine to cut upwardly). Provision of a non-linear potentiometer of this type also allows at least a partial compensation for the fact that the output of the coal thickness measuring arrangement is not linear with respect to coal thickness.

It will be understood that modifications can be made within the scope of the invention; for example the front pair of jacks 3 could be used to effect steering, or by controlling one of the pair of jacks 2 with respect to the other the machine could be tilted transverse to its normal direction of motion.

We claim:
1. Apparatus for automatically controlling the steering of a mineral mining machine comprising an extensible hydraulic jack connected with the machine and controlling the direction of travel of the machine in a direction perpendicular to the plane of a mineral seam, means for producing a first electrical signal having a characteristic dependent on the extension of the jack, a source of electromagnetic radiation mounted on the machine and directing radiation into material of the seam at a location adjacent the machine, a radiation detection device carried by the machine, the device being responsive to the amount of radiation back-scattered by said material adjacent the machine and producing a second electrical signal having a characteristic dependent on the amount of back-scattered radiation received by the device, an electrical discriminating means connected to be fed with both said signals and producing from them an output signal having a characteristic indicative of the steering correction required to restore the machine to a described direction of travel in the mineral, and an electro-hydraulic valve connected to receive the output signal and responsive to the output signal and controlling the supply or exhaust of hydraulic fluid to or from the jack to effect steering of the machine.

2. Apparatus for automatically controlling the steering of a mineral mining machine, comprising an assembly of skids supporting the machine, an extensible hydraulic jack connected with the machine and the skids to vary the relative position of the machine and skids to control the direction of travel of the machine in a direction perpendicular to the plane of a mineral seam, a potentiometric means producing a first electric signal having a characteristic dependent on the extension of the jack, a source of electromagnetic radiation mounted on the machine and directing radiation into material at the seam at a location adjacent the machine, a radiation detection device responsive to the amount of radiation back-scattered by said material adjacent to the machine and producing a second electrical signal having a characteristic dependent on the amount of back-scattered radiation received by the device, means for producing a reference signal chosen to correspond to the back-scattered radiation received at a given desired position of the machine in the mineral, means for algebraically comparing the reference signal with said second signal to produce an error signal, an electrical discriminator means connected to receive the error signal and the first signal and producing an output signal characteristic indicative of the steering correction required to restore the machine to a described direction of travel in the mineral, and an electro-hydraulic valve connected to receive the output signal and responsive to the output signal and controlling the supply or exhaust of hydraulic fluid to or from the jack to effect steering of the machine.

3. Apparatus as claimed in claim 2, in which the potentiometric means is a non-linear potentiometer.

4. Apparatus as claimed in claim 2, in which the potentiometric means comprises first and second potentiometers the first providing the first signal when the jack extends beyond a predetermined position, and the second providing the first signal when the jack is contracted beyond said predetermined position.

5. Apparatus as claimed in claim 2, in which the source includes Thulium 170.

References Cited by the Examiner

UNITED STATES PATENTS 2,761,666    9/1956    Heimaster et al. _____ 299—1
3,019,338    1/1962    Monaghan et al.

FOREIGN PATENTS 857,251    12/1960    Great Britain.

OTHER REFERENCES

"Radioactive Pickup for Automatic Control of Mining Machinery," Mining Congress Journal, March 1961, pp. 45–47.

ERNEST R. PURSER, *Primary Examiner.*

BENJAMIN HERSH, CHARLES E. O'CONNELL,
*Examiners.*